(12) United States Patent
Karpagavinayagam et al.

(10) Patent No.: US 11,048,570 B2
(45) Date of Patent: Jun. 29, 2021

(54) TECHNIQUES OF MONITORING AND UPDATING SYSTEM COMPONENT HEALTH STATUS

(71) Applicant: American Megatrends International, LLC, Duluth, GA (US)

(72) Inventors: Manickavasakam Karpagavinayagam, Norcross, GA (US); Manish Jha, Norcross, GA (US); Harikrishna Doppalapudi, Norcross, GA (US); Purandhar Nallagatla, Johns Creek, GA (US); Chandrasekar Rathineswaran, Cumming, GA (US)

(73) Assignee: AMERICAN MEGATRENDS INTERNATINOAL, LLC, Duluth, GA (US)

( * ) Notice: Subject to any disclaimer, the term of this patent is extended or adjusted under 35 U.S.C. 154(b) by 89 days.

(21) Appl. No.: 15/833,240

(22) Filed: Dec. 6, 2017

(65) Prior Publication Data

US 2019/0171507 A1     Jun. 6, 2019

(51) Int. Cl.
*G06F 11/00* (2006.01)
*G06F 11/07* (2006.01)

(52) U.S. Cl.
CPC ........ *G06F 11/076* (2013.01); *G06F 11/0709* (2013.01); *G06F 11/0769* (2013.01)

(58) Field of Classification Search
CPC .............. G06F 11/076; G06F 11/0709; G06F 11/0769; G06F 11/006; G06F 11/0703; G06F 11/0706; G06F 11/0751; G06F 11/0754; G06F 11/0766; G06F 11/0772; G06F 11/0787; G06F 11/2205; G06F 11/2273; G06F 11/2284; G06F 11/2289; G06F 11/2294
See application file for complete search history.

(56) References Cited

U.S. PATENT DOCUMENTS

| | | | | |
|---|---|---|---|---|
| 7,546,487 B2* | 6/2009 | Marisetty | ............ | G06F 11/0793 714/10 |
| 8,713,350 B2* | 4/2014 | Walton | ................ | G06F 11/0793 714/3 |
| 8,839,032 B2* | 9/2014 | Walton | ................ | G06F 11/0712 714/15 |
| 2003/0079007 A1* | 4/2003 | Merkin | ................ | G06F 11/0745 709/223 |
| 2015/0143095 A1* | 5/2015 | Maity | ................. | G06F 11/1417 713/2 |
| 2016/0006620 A1* | 1/2016 | Maity | ................. | H04L 41/0853 715/733 |
| 2016/0011880 A1* | 1/2016 | Maity | ................... | G06F 9/4401 710/261 |
| 2017/0255506 A1* | 9/2017 | Gujarathi | .............. | G06F 11/079 |

* cited by examiner

*Primary Examiner* — Anthony J Amoroso
(74) *Attorney, Agent, or Firm* — Locke Lord LLP; Tim Tingkang Xia, Esq.

(57) ABSTRACT

In an aspect of the disclosure, a method, a computer-readable medium, and a computer system are provided. The computer system includes an initialization component of a host. The initialization component obtains health data indicating that at least one hardware component of the host is in one of one or more predetermined health conditions when executed in a system management mode of the host. The initialization component then sends, to a service processor of the host, a message in accordance with a management protocol. The message includes the health data.

14 Claims, 5 Drawing Sheets

TECHNIQUES OF MONITORING AND UPDATING SYSTEM COMPONENT HEALTH STATUS

BACKGROUND

Field

The present disclosure relates generally to computer systems, and more particularly, to a service processor and an initialization component of a host that may operate together to monitor and update health status of the host during runtime.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

In one aspect of the present disclosure, a host can evoke an initialization component of the host during runtime when hardware components of the host are in certain predetermined health conditions and send health data to the initialization component. Accordingly, there is a need for a mechanism that can transfer the health data to a service processor of the host for further processing and analysis.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system includes an initialization component of a host. The initialization component obtains health data indicating that at least one hardware component of the host is in one of one or more predetermined health conditions when executed in a system management mode of the host. The initialization component then sends, to a service processor of the host, a message in accordance with a management protocol. The message includes the health data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
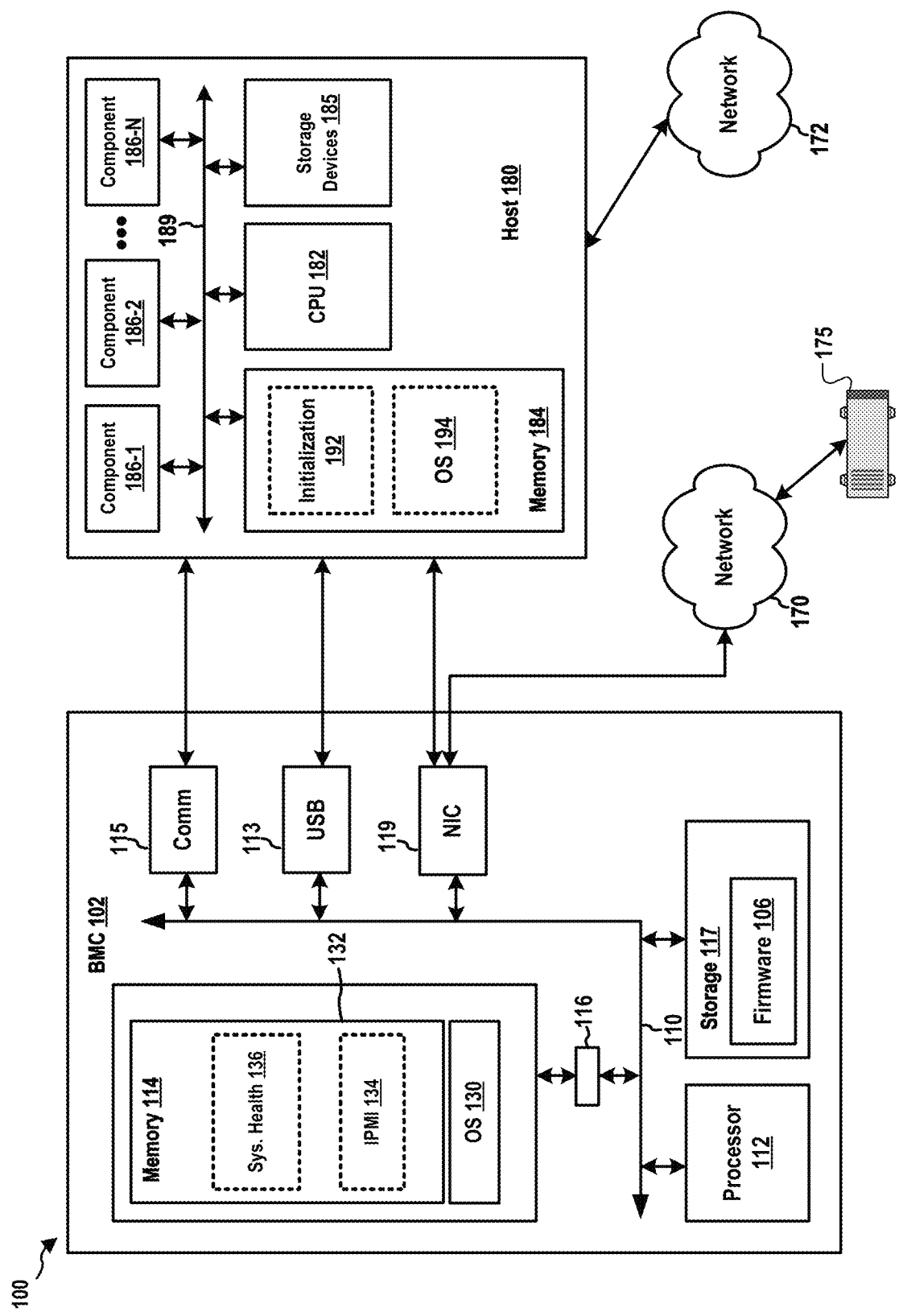
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a network interface card 119, a Universal Serial Bus (USB) interface 113 and other communication interfaces 115.

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an operating system (OS) 130 and service components 132. The service components 132 includes, among other components, IPMI services 134 and a host health monitor 136. Further, the service components 132 may be implemented as a service stack. As such, the BMC firmware 106 can provide an embedded system to the BMC 102.

The BMC 102 may be in communication with the host computer 180 through the USB interface 113, the network interface card 119, the communication interfaces 115, and/or the IPMI interface.

The host computer 180 includes a host CPU 182, a host memory 184, storage devices 185, and hardware components 186-1 to 186-N. The hardware components 186-1 to 186-N can be any suitable type of hardware components that are installed on the host computer 180, including additional CPUs, memories, and storage devices. As a further example, the hardware components 186-1 to 186-N can also include Peripheral Component Interconnect Express (PCIe) devices. Further, the hardware components 186-1 to 186-N can include hardware components of a computer 502 shown in FIG. 5.

After the host computer 180 is powered on, the host CPU 182 loads an initialization component 192 (e.g., a basic input/output system (BIOS)) from the storage devices 185 into the host memory 184 and executes the initialization component 192. The initialization component 192, among other things, performs hardware initialization during the booting process (power-on startup). For example, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the hardware components 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, are functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located.

After the hardware initialization is performed, the initialization component 192 can read a bootstrap loader from a predetermined location from a boot device of the storage devices 185, usually a hard disk of the storage devices 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Figure 2:
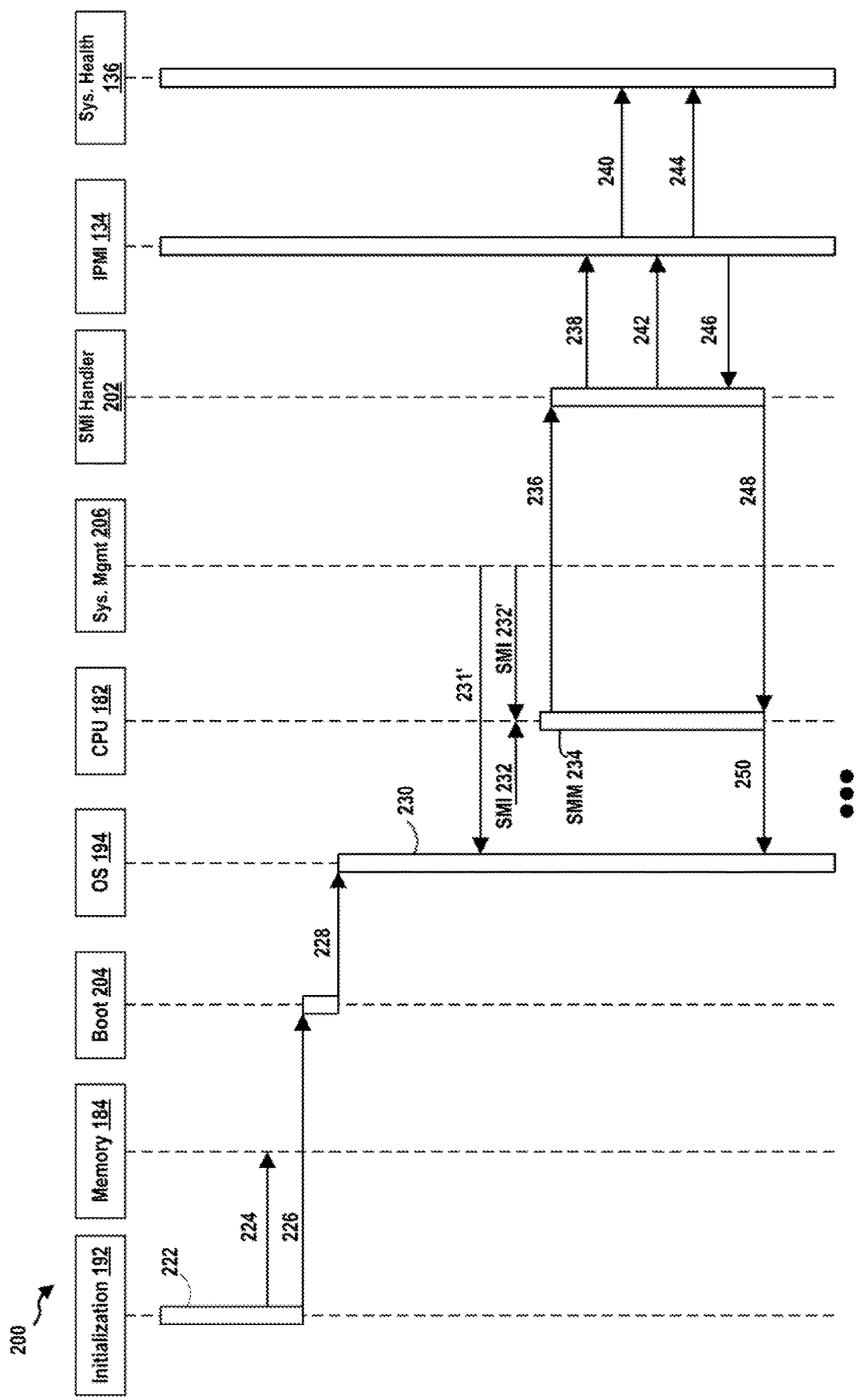
FIG. 2 is a diagram a sequence of procedures performed by the computer system.

FIG. 2 is a diagram 200 illustrating a sequence of procedures performed by the computer system 100. In procedure 222, the host computer 180 is powered on or reset. Accordingly, initialization component 192 starts an initialization process. As described supra, the initialization component 192 can perform the POST and other routines on the hardware components of the host computer 180, which includes the host CPU 182, the host memory 184, the storage devices 185, and the hardware components 186-1 to 186-N. As such, the initialization component 192 can gather health status of those hardware components. In procedure 224, the initialization component 192 stores a code and data for an SMI handler 202 at a particular location of the memory 114. As described infra, the host CPU 182 can be interrupted to enter a system management mode (SMM). When the host CPU 182 enters the SMM, the host CPU 182 executes the SMI handler 202 stored at the pre-configured location. The SMI handler 202 can be considered as part of the initialization component 192. Accordingly, the initialization component 192 can considered as the program being executed during the SMM.

In procedure 226, the initialization component 192 loads a boot program 204 (e.g., a bootstrap loader) from the storage devices 185 into the host memory 184. In procedure 228, the boot program 204 loads the OS 194 from the storage devices 185 into the memory 114.

In procedure 230, the OS 194 initializes and then operates to manage the resources of the host computer 180. During procedure 230, the OS 194 may detect that one or more components of the host CPU 182, the host memory 184, the storage devices 185, and the hardware components 186-1 to 186-N have generated an error. For example, one of the storage devices 185 may be a hard disk. The OS 194 may detect that the hard disk has generated a series of disk I/O errors. Further, one of the hardware components 186-1 to 186-N may be a network interface card (NIC). The OS 194 may detect that the NIC has a power failure.

In procedure 232, in response to detecting the hardware component errors by a hardware component, that component (e.g., a memory or a PCIe device) can send a system management interrupt (SMI) to the host CPU 182. Further, the host computer 180 may have other system management components 206. The system management components 206 may include software components and/or hardware components. The system management components 206 monitors the health conditions of the host CPU 182, the host memory 184, the storage devices 185, and the hardware components 186-1 to 186-N. For example, the system management components 206 may monitor the temperature of the host CPU 182 or the voltage of the host memory 184. When the system management components 206 detects that one or more of the host CPU 182, the host memory 184, the storage devices 185, and the hardware components 186-1 to 186-N are in a predetermined health condition, the system management components 206 may, in procedure 232', send an SMI to the host CPU 182.

In procedure 234, after receiving the SMI, the host CPU 182 enters into a system management mode (SMM), during which normal operation of the OS 194 is suspended.

In procedure 236, the host CPU 182 reads the code and data of the SMI handler 202 from the pre-configured location of the host memory 184 (or another storage device such as a ROM) and, accordingly, executes the SMI handler 202. As such, the SMI handler 202 gains control of the host CPU 182.

The SMI handler 202 reads data from a chipset specific register or a CPU model-specific register (MSR) to identify the component that failed or generated the errors and to obtain error information. The data may be stored in the chipset specific register or the MSR by the hardware component that failed or by the system management components 206. Once the component is identified, the SMI handler 202 will construct or frame a BMC SEL record that has information of the failed component (e.g., field-replaceable unit (FRU) location) and information regarding the severity of the errors. The severity of the errors may be used to reflect the hardware health status (e.g., "OK," "Warning," or Critical). Therefore, the SMI handler 202 can obtain the health data.

More specifically, the SMI handler 202 is implemented with one or more management protocols (e.g., IPMI). Accordingly, the SMI handler 202 can establish a communication channel with the BMC 102 in accordance with a management protocol. The SMI handler 202 subsequently can use a message defined by the management protocol to send the health data to the BMC 102. In this example, the SMI handler 202 constructs an IPMI message that includes an original equipment manufacturer (OEM) system event log (SEL) record as defined in IPMI. The OEM SEL record may be 16 bytes long, with bytes 1-2 used to carry a Record ID, bytes 3 used to carry a Record Type, bytes 4-7 used to carry a Timestamp, bytes 8-10 used to carry a Manufacturer ID, and bytes 11-16 used to carry the health data of the host computer 180. The health data may indicate, among other things, the identity of the hardware component (e.g., the host CPU 182) for which the health data were generated, the type of health condition (e.g., thermal or power), the severity of the health condition (e.g., low, medium, or high), health condition data (e.g., the actual temperature of the host CPU 182), etc.

In procedure 238, the SMI handler 202 opens a communication channel with the IPMI services 134 of the BMC 102, and sends the IPMI message to the IPMI services 134.

At the BMC 102, the IPMI services 134 receive the IPMI messages sent by the SMI handler 202. The IPMI services 134 extract the SEL record from the IPMI message. The IPMI services 134 may further process the SEL record and determine that the SEL record is an OEM SEL record carrying health data concerning the host computer 180. Subsequently, in procedure 240, the IPMI services 134 sends the health data to the host health monitor 136. The host health monitor 136 can store the health data in a data store (e.g., a database) on the BMC 102 or in the communication network 170. In certain configurations, the host health monitor 136 can further analyze the health data of a period of time stored in the data store to determine the overall health condition of each of the host CPU 182, the host memory 184, the storage devices 185, and the hardware components 186-1 to 186-N N. For example, the host health monitor 136 may determine the frequency and severity of errors (e.g., disk I/O errors) generated by particular a hardware component. When the frequency and severity meets predetermined thresholds (e.g., 5 severe errors in 12 hours), the host health monitor 136 may determine that the particular hardware component is defective and generate a warning for that particular hardware component. Based on the warning, the defective hardware component can be removed and replaced by another working component.

In certain configurations, the host health monitor 136 may determine a corrective action for a hardware component of the host computer 180 that is determined to have a severe health condition. Accordingly, the host health monitor 136 may construct an instruction that instructs the SMI handler 202 to perform the corrective action. For example, the host health monitor 136 may determine that the host CPU 182 has reached a critical high temperature based on the health data. Accordingly, the host health monitor 136 can construct an instruction that instructs the SMI handler 202 to increase the speed of a fan adjacent to the host CPU 182. In this configuration, the SMI handler 202 can, in procedure 242, send a IPMI request to the IPMI services 134 to obtain any instructions that may be generated by the host health monitor 136. In procedure 244, the IPMI services 134 may obtain the instruction from the host health monitor 136. In procedure 246, the IPMI services 134 construct an IPMI response to carry the instructions and send the IPMI response to the SMI handler 202 in accordance with IPMI. Upon receiving the IPMI response, the SMI handler 202 can extract the instruction from the IPMI response and, according to the instruction, carry out the corrective action (e.g., increase the CPU fan).

In procedure 248, the SMI handler 202 terminates its execution. Accordingly, in procedure 250, the host CPU 182 returns the control to the OS 194, and the OS 194 resumes its operation.

Figure 3:
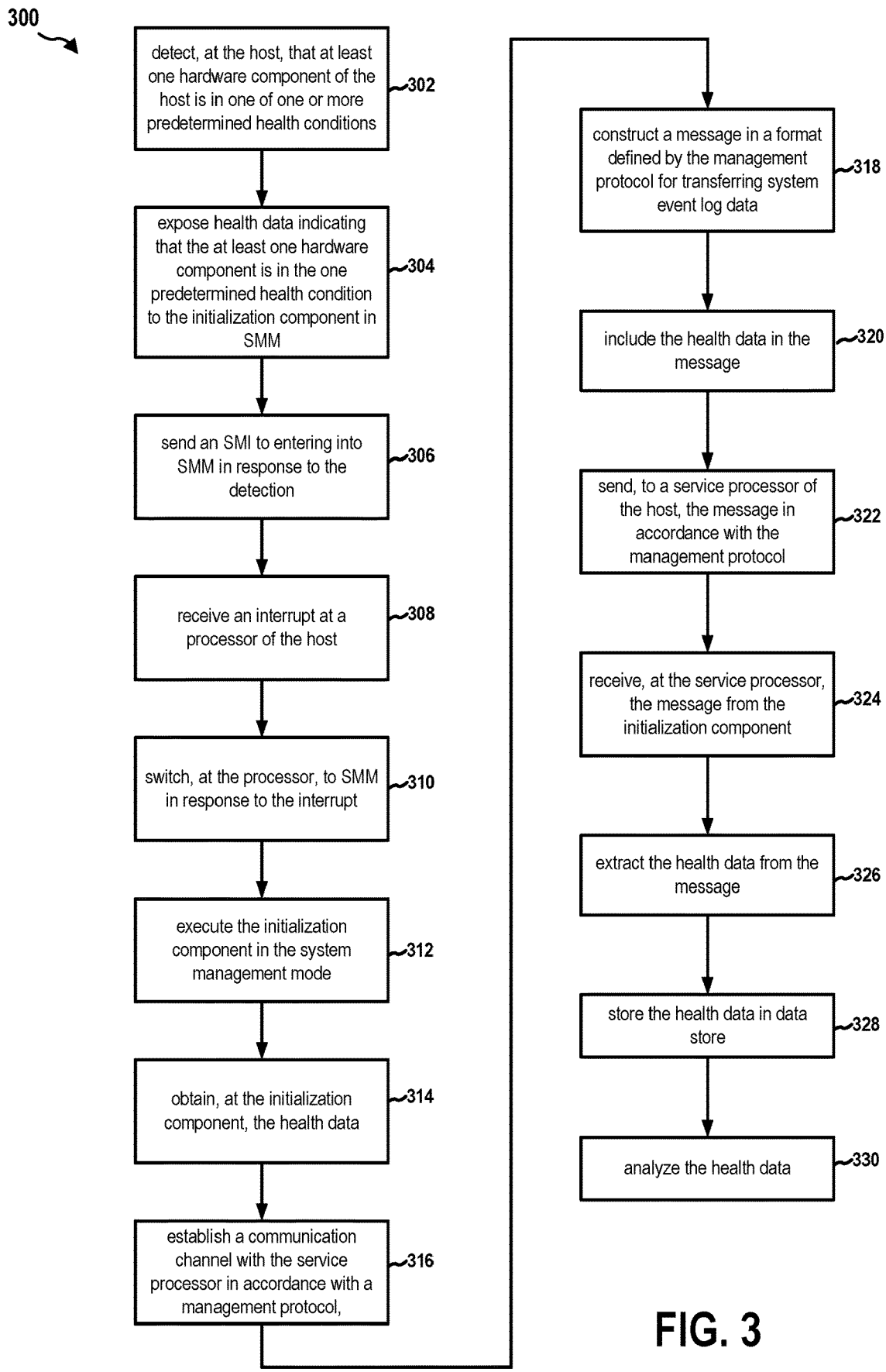
FIG. 3 is a flow chart of a method (process) for decrypting data.

FIG. 3 is a flow chart 300 of a method (process) for decrypting data. The method may be performed by a computer system (e.g., the computer system 100) including a host (e.g., the host computer 180) and a service processor (e.g., the BMC 102 and the apparatus 102'). The host includes an initialization component (e.g., the initialization component 192).

At operation 302, the host detects that at least one hardware component is in one of one or more predetermined health conditions. At operation 304, the host exposes health data to the initialization component. The health data indicates that the at least one hardware component is in the one predetermined health condition. At operation 306, the host sends an interrupt to cause a CPU of the host to enter into SMM in response to the detection.

At operation 308, a processor of the host receives the interrupt. At operation 310, the processor switches to the system management mode in response to the interrupt. At operation 312, the processor executes the initialization component in a system management mode.

At operation 314, the initialization component operates in the system management mode and obtains the health data. At operation 316, the initialization component establishes a communication channel with the service processor in accordance with a management protocol. At operation 318, the initialization component constructs a message in a format defined by the management protocol for transferring system event log data. At operation 320, the initialization component includes the health data in the message. At operation 322, the initialization component sends, to a service processor of the host, the message in accordance with the management protocol.

At operation 324, the service processor receives the message from the initialization component. At operation 326, the service processor extracts the health data from the message. At operation 328, the service processor stores the health data in data store. At operation 330, the service processor analyzes the health data. In certain configurations, the service processor determines that a first hardware component of the at least one hardware components is defective based on the health data in the data store. In certain configurations, the first hardware component is determined to be defective based on a number of times the first hardware component has been in the one or more predetermined health conditions.

Figure 4:
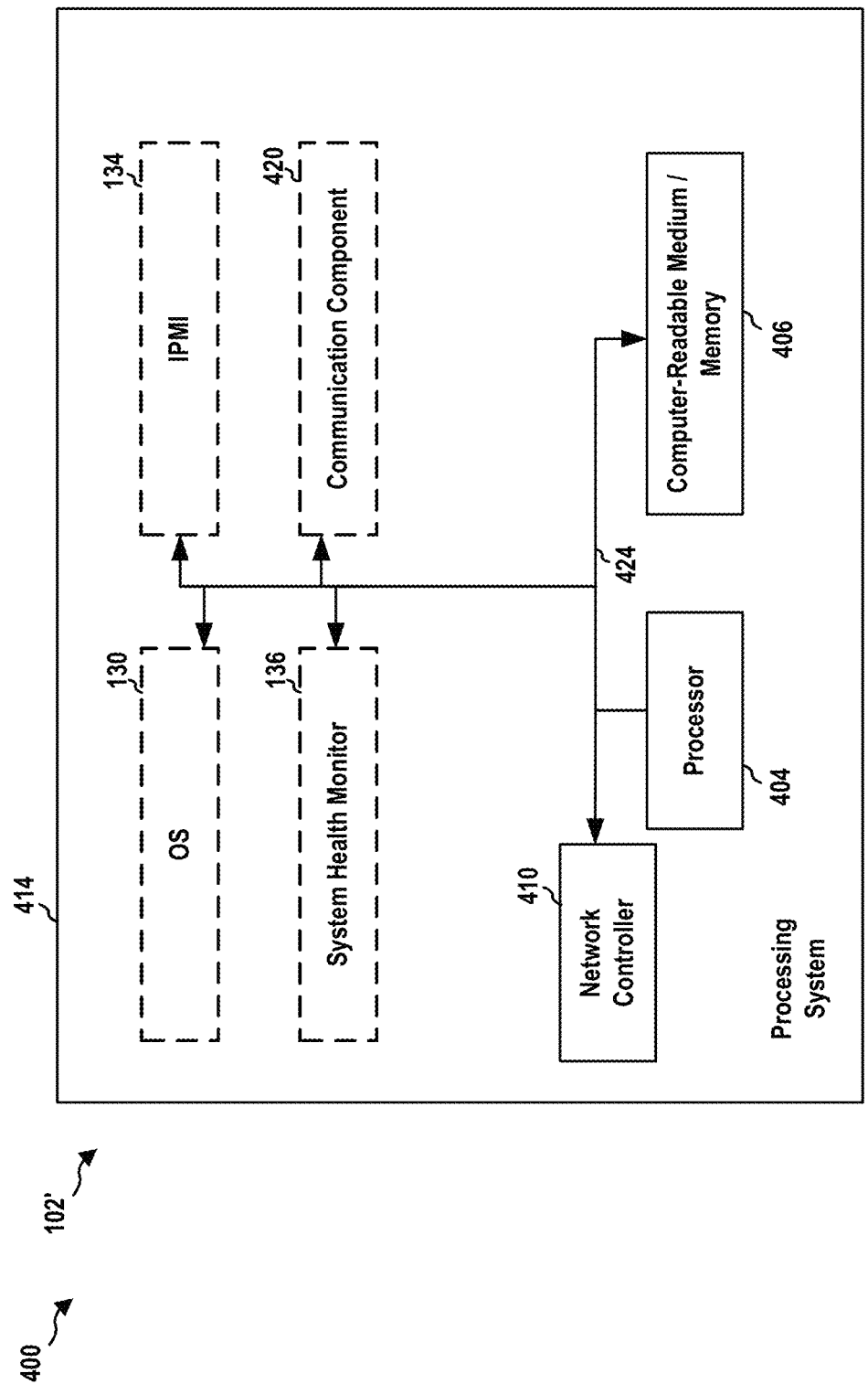
FIG. 4 is a diagram illustrating an example of a hardware implementation for an apparatus employing a processing system.

FIG. 4 is a diagram 400 illustrating an example of a hardware implementation for an apparatus 102' employing a processing system 414. The apparatus 102' may implement the BMC 102. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the computer-readable medium/memory 406, a network controller 410, etc.

The computer-readable medium/memory 406 may include the memory 114 and/or the storage 117 The bus 424 may also link various other circuits such as timing sources, peripherals, voltage regulators, and power management circuits, which are well known in the art, and therefore, will not be described any further.

The processing system 414 may be coupled to the network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 102'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the OS 130, the IPMI services 134, and the host health monitor 136. The components may be software components running in the processor 404, resident/stored in the computer readable medium/memory 406, one or more hardware components coupled to the processor 404, or some combination thereof.

The apparatus 102' may be configured to include means for performing operations described supra referring to FIG. 3. The aforementioned means may be one or more of the aforementioned components of the apparatus 102 and/or the processing system 414 of the apparatus 102' configured to perform the functions recited by the aforementioned means.

Figure 5:
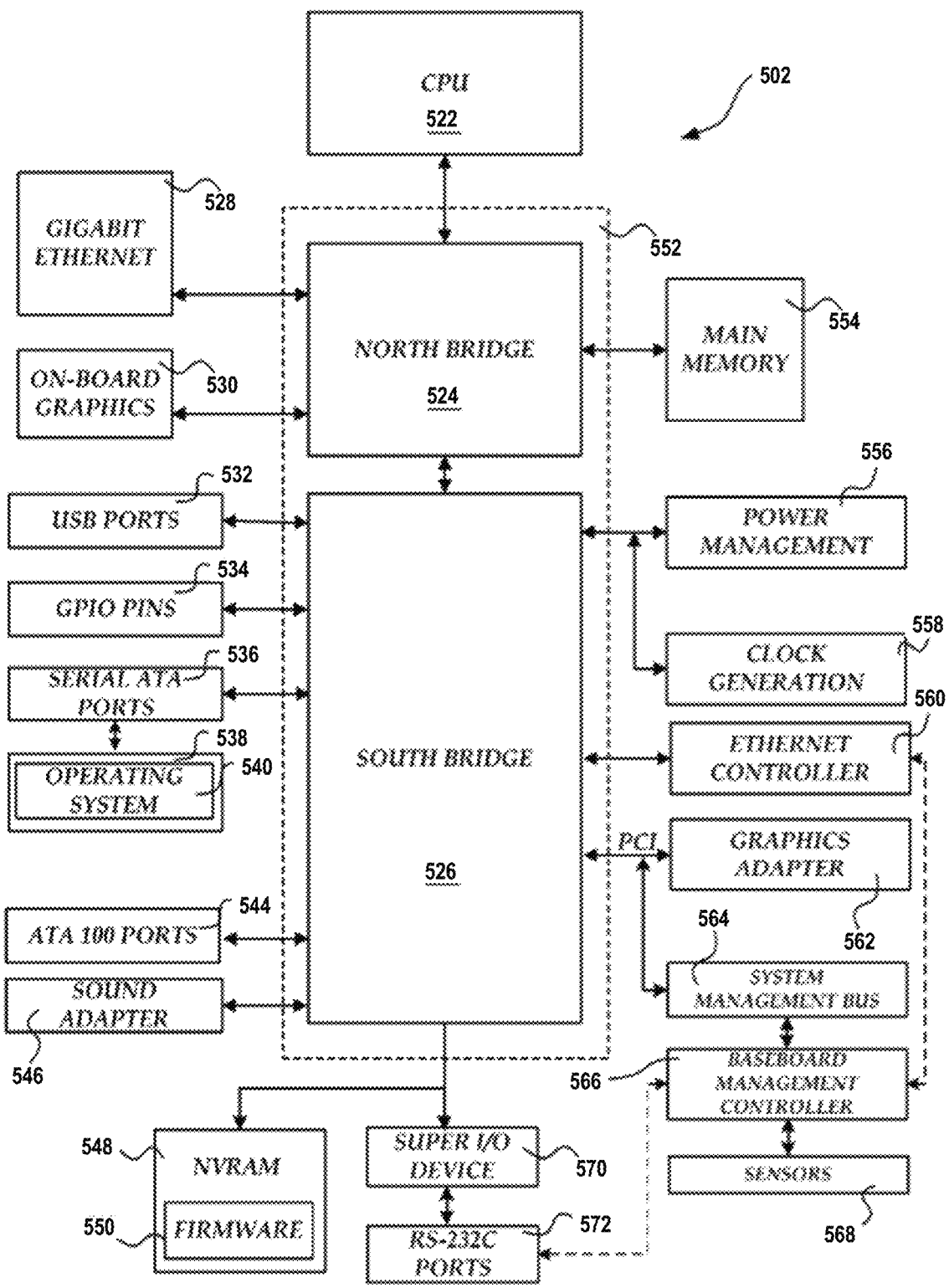
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 180, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, the computer system including an initialization component of a host, comprising:
   detecting, by an operating system of the host, that at least one hardware component of the host is in one of one or more predetermined health conditions;
   determining, at the host and in response to the detection, to transmit health data of the host to a service processor of the host for determining at the service processor a corrective action directed to the one predetermined health condition;
   sending an interrupt to a processor of the host in response to the determination to transmit the health data;
   receiving, at the processor of the host, the interrupt during executing the operating system of the host at the processor;
   switching, at the processor, to a system management mode (SMM) in response to the interrupt;
   executing, at the processor, the initialization component in the SMM;
   obtaining, at the initialization component and in the SMM, health data indicating that the at least one hardware component of the host is in the one predetermined health condition;
   initiating, by the initialization component executed in the SMM at the host, a data transfer from the host to a service processor of the host, including: sending, from the initialization component executed in the SMM at the host to the service processor of the host, a message in accordance with a management protocol, wherein the message is an original equipment manufacturer (OEM) system event log (SEL) record in accordance with Intelligent Platform Management Interface (IPMI) standards and including the health data;
   sending, at the initialization component and in the SMM, a request to the service processor to obtain an instruction of the corrective action, wherein the service processor determines the corrective action based on the health data; and
   receiving, at the initialization component and in the SMM, the instruction of a corrective action from the service processor through an IPMI message.

2. The method of claim 1, further comprising:
   establishing a communication channel with the service processor in accordance with the management protocol,
   constructing the message, the message is in a format defined by the management protocol for transferring system event log data; and
   including the health data in the message prior to sending the message.

3. The method of claim 1, wherein the computer system further includes the service processor, the method further comprising:
   receiving, at the service processor, the message from the initialization component;
   extracting the health data from the message; and
   storing the health data in a data store.

4. The method of claim 3, further comprising:
determining that a first hardware component of the at least one hardware component is defective based on the health data in the data store.

5. The method of claim 4, wherein the first hardware component is determined to be defective based on a number of times the first hardware component has been in the one or more predetermined health conditions.

6. A computer system, comprising:
a host, including:
a memory; and
at least one processor coupled to the memory and configured to:
detect, by an operating system of the host, that at least one hardware component of the host is in one of one or more predetermined health conditions;
determine, at the host and in response to the detection, to transmit health data of the host to a service processor of the host for determining at the service processor a corrective action directed to the one predetermined health condition;
send an interrupt to the at least one processor of the host in response to the determination to transmit the health data;
receive the interrupt during executing the operating system of the host at the at least one processor;
switch to a system management mode (SMM) in response to the interrupt;
execute an initialization component of the host in the SMM;
obtain, at the initialization component and in the SMM, health data indicating that the at least one hardware component of the host is in the one predetermined health condition;
initiate, by the initialization component executed in the SMM at the host, a data transfer from the host to a service processor of the host, wherein to initiate the data transfer, the at least one processor is further configured to: send, from the initialization component executed in the SMM at the host to the service processor of the host, a message in accordance with a management protocol, wherein the message is an original equipment manufacturer (OEM) system event log (SEL) record in accordance with Intelligent Platform Management Interface (IPMI) standards and including the health data;
send, at the initialization component and in the SMM, a request to the service processor to obtain an instruction of the corrective action, wherein the service processor determines the corrective action based on the health data; and
receive, at the initialization component and in the SMM, the instruction of a corrective action from the service processor through an IPMI message.

7. The computer system of claim 6, wherein the at least one processor is further configured to:
establish a communication channel with the service processor in accordance with the management protocol,
construct the message, the message is in a format defined by the management protocol for transferring system event log data; and
include the health data in the message prior to sending the message.

8. The computer system of claim 6, wherein the computer system further includes the service processor, wherein the at least one processor is further configured to:
receive, at the service processor, the message from the initialization component;
extract the health data from the message; and
store the health data in a data store.

9. The computer system of claim 8, wherein the at least one processor is further configured to:
determine that a first hardware component of the at least one hardware component is defective based on the health data in the data store.

10. The computer system of claim 9, wherein the first hardware component is determined to be defective based on a number of times the first hardware component has been in the one or more predetermined health conditions.

11. A non-transitory computer-readable medium storing computer executable code for operating a computer system, the computer system including an initialization component of a host, comprising code to:
detect, by an operating system of the host, that at least one hardware component of the host is in one of one or more predetermined health conditions;
determine, at the host and in response to the detection, to transmit health data of the host to a service processor of the host for determining at the service processor a corrective action directed to the one predetermined health condition;
send an interrupt to the at least one processor of the host in response to the determination to transmit the health data;
receive, at the processor of the host, the interrupt during executing the operating system of the host;
switch, at the processor, to a system management mode (SMM) in response to the interrupt;
execute, at the processor, an initialization component of the host in the SMM;
obtain, at the initialization component and in the SMM, health data indicating that the at least one hardware component of the host is in the one predetermined health condition;
initiate, by the initialization component executed in the SMM at the host, a data transfer from the host to a service processor of the host, wherein to initiate the data transfer, the at least one processor is further configured to: send, from the initialization component executed in the SMM at the host to the service processor of the host, a message in accordance with a management protocol, wherein the message is an original equipment manufacturer (OEM) system event log (SEL) record in accordance with Intelligent Platform Management Interface (IPMI) standards and including the health data;
send, at the initialization component and in the SMM, a request to the service processor to obtain an instruction of the corrective action, wherein the service processor determines the corrective action based on the health data; and
receive, at the initialization component and in the SMM, the instruction of a corrective action from the service processor through an IPMI message.

12. The non-transitory computer-readable medium of claim 11, wherein the code is further configured to:
establish a communication channel with the service processor in accordance with the management protocol, construct the message, the message is in a format defined by the management protocol for transferring system event log data; and include the health data in the message prior to sending the message.

13. The non-transitory computer-readable medium of claim 11, wherein the computer system further includes the service processor, wherein the code is further configured to:

receive, at the service processor, the message from the initialization component;

extract the health data from the message; and store the health data in a data store.

14. The non-transitory computer-readable medium of claim 13, wherein the code is further configured to:

determine that a first hardware component of the at least one hardware component is defective based on the health data in the data store.

\* \* \* \* \*